3,475,466
NOVEL 17,21-DIESTERS OF 16α-METHYL-9α,11β-DICHLORO-1,4-PREGNADIENES

Hershel L. Herzog, Glen Ridge, and Elliot L. Shapiro, Cedar Grove, N.J., assignors to Schering Corporation, Bloomfield, N.J., a corporation of New Jersey
No Drawing. Filed Aug. 30, 1965, Ser. No. 483,809
Int. Cl. C07c *169/36, 169/30;* A61k *27/00*
U.S. Cl. 260—397.45                                   6 Claims

ABSTRACT OF THE DISCLOSURE

This invention relates to novel 17,21-diesters of 16α-methyl-9α,11β-dichloro-1,4-pregnadienes, to methods for preparing the same and to their use as anti-inflammatory agents.

---

This invention relates to new compositions of matter classifiable in the field of steroid chemistry as 17α,21-di-lower alkanoic acid esters of 9α,11β-dichloro-16α-methyl-1,4-pregnadiene-17α,21-diol-3,20-dione and to the use of these compositions in the application of anti-inflammatory therapy. More particularly, the instant invention relates to such diesters wherein the lower alkanoic acid moieties may each contain from 1 to 5 carbon atoms.

In its composition aspect, therefore, the instant invention may be described as residing in the concept of anti-inflammatory compositions of matter characterized in terms of molecular structure as 9α,11β-dichloro-16α-methyl-1,4-pregnadiene-3,20-dione having attached to the 17α- and 21-positions a lower alkanoyloxy group.

The instant invention is based upon applicants' discovery that the di-esters defined above are unusually potent topical anti-inflammatory agents displaying as a group an anti-inflammatory activity far greater than that of the corresponding 16β-methyl- or 16-desmethyl analogs. The anti-inflammatory activity of these di-esters has been confirmed in vivo in rats employing standard pharmacological techniques such as the intracutaneous pouch assay and clinically in topical application by the McKenzie test (see McKenzie and Atkinson, Topical Activities of Betamethasone Esters in Man. Arch. Derm., 1964, vol. 89, 741–746).

As pointed out above, the term "lower alkanoic acid ester" is intended to include esters wherein the lower alkanoic acid moiety may contain from 1 to 5 carbon atoms. Included within this group are both straight and branched chain lower alkanoic acids such as, for example, acetic, propionic, butyric, isobutyric and valeric acids. Di-esters derived from such lower alkanoic acids, therefore, would include the 17α,21-diacetate, the 17α,21-dipropionate, the 17α,21-dibutyrate and the 17α,21-diisobutyrate.

It is not essential, however, that the ester groupings at C–17 and C–21 be derived from the same lower alkanoic acid. Mixed di-esters such as, for example, the 17α-butyrate-21-acetate, the 17α-propionate-21-acetate, the 17α-acetate, 21-butyrate, the 17α-acetate-21-propionate and the like, are also included within the scope of this invention.

Particularly advantageous di-esters are those derived from lower alkanoic acids having from 3 to 4 carbon atoms. These di-esters include the 17α,21-dipropionate, the 17α-propionate-21-butyrate, the 17α,21-dibutyrate and the 17α-butyrate-21-propionate.

The di-esters of this invention wherein the ester groupings at C–17 and C–21 are derived from the same lower alkanoic acid are readily obtained by conventional esterification techniques from the corresponding 17α,21-diol, a compound well-known in the art. The 17α,21-dipropionate of 9α,11β - dichloro - 16α-methyl-1,4-pregnadiene-17α,21-diol-3,20-dione may be prepared, for example, by treating the diol with a mixture of trifluoroacetic anhydride and propionic acid at a temperature about 80 to about 100° C. for about 30 to about 90 minutes. The 9α,11β - dichloro-16α-methyl-1,4-pregnadiene-17α,21-diol-3,20-dione 17α,21-dipropionate so produced is conveniently precipitated from the reaction mixture by addition of water thereto and the precipitate may then be separated by filtration and purified by recrystallization from an inner organic solvent or solvent mixture such as, for example, methanol, ethanol, acetone, ethyl acetate, acetone-hexane, etc., or by chromatography using an adsorbent such as silica gel or magnesium silicates. Where it is desired to prepare di-esters other than the dipropionate, it is only necessary to substitute the desired lower alkanoic acid for propionic acid employed in the reaction described above.

The unsymmetrical di-esters of the instant invention are also readily prepared by conventional esterification techniques employing as the starting material a 9α,11β-dichloro - 16α - methyl-1,4-pregnadiene-17α,21-diol-3,20-dione 21-lower alkanoic acid ester wherein the lower alkanoic acid moiety, as mentioned above, contains from 1 to 5 carbon atoms. Preparation of the 21-monoester starting material is readily accomplished by treating the corresponding diol, 9α,11β-dichloro-16α-methyl-1,4-pregnadiene-17α,21-diol-3,20-dione, with a lower alkanoic acid chloride or anhydride in pyridine. Thus the 21-monopropionate ester, for example, may be prepared by treating the diol with propionic acid chloride or propionic anhydride in pyridine at a temperature of about 0 to about 30° C. for about 1 to about 24 hours. Precipitation, recovery and purification of the monoester may be accomplished by the techniques described above for the di-ester. Any desired ester grouping may be introduced at C–21 by substituting the appropriate lower alkanoic acid chloride or anhydride for the propionic acid chloride employed in this illustration.

Introduction of the second and dissimilar ester grouping at C–17 in 21-monoester starting material is accomplished by employing the same techniques as described above for the di-esterification reaction. Thus 9α,11β-dichloro-16α - methyl - 1,4-pregnadiene-17α,21-diol-3,20-dione 17α-butyrate-21-propionate, for example, may be prepared by treating the corresponding 21-propionate with a mixture of trifluoroacetic anhydride and butyric acid at a temperature of about 80° to about 100° C. for about 30 to about 90 minutes. The 17α-butyrate-21-propionate is worked up as previously described to yield the purified unsymmetrical di-ester.

Alternatively, both the symmetrical and unsymmetrical di-esters of this invention may be prepared by treating the diol, 9α,11β - dichloro - 16α-methyl-1,4-pregnadiene-17α,21-diol-3,20-dione with a lower alkyl ester of an orthocarboxylic acid in the presence of an acid catalyst to form the corresponding 17,21-orthoester which upon acid hydrolysis is converted into the corresponding 17α-monoester. Introduction of the ester grouping at C–21, which may be the same as or different from the ester grouping at C–17, is readily accomplished by the method previously described.

The best mode contemplated by applicants for carrying out the instant invention will now be more fully set forth in the following examples; it being understood that these examples are for purpose of illustration merely and no limitation is intended except as set forth in the appended claims.

EXAMPLE 1.—9α,11β-DICHLORO-16α-METHYL-1,4-PREGNADIENE-17α,21-DIOL-3,20 - DIONE 17α,21-DIPROPIONATE

Add 5 g. of 9α,11β-dichloro-16α-methyl-1,4-pregnadiene-17α,21-diol-3,20-dione to a freshly prepared solution consisting of 50 ml. of propionic acid and 20 ml. of trifluoroacetic anhydride. Heat on a steam bath at approximately 90° C. for about 45 minutes. Cool and add 20 ml. of water. Pour the reaction mixture into 700 ml. of water. Collect the insolubles by filtration. Purify the crude di-ester so obtained by chromatography over Florisil (500 g.), eluting with increasing percentages of ether in hexane and combining like fractions. Evaporate the combined eluate to dryness and recrystallize the purified di-ester from acetone-hexane.

EXAMPLE 2.—9α,11β-DICHLORO-16α-METHYL-1,4-PREGNADIENE-17α,21-DIOL - 3,20 - DIONE 17α-BUTYRATE-21-ACETATE (a) Preparation of 9α,11β-dichloro-16α-methyl-1,4-pregnadiene-17α,21-diol-3,20-dione 21-acetate Add 1 g. of 9a,11β-dichloro-16α-methyl-1,4-pregnadiene-17a,21-diol-3,20-dione to a solution containing 5 ml. of pyridine and 1 ml. of acetic anhydride. Allow the reaction mixture to remain at room temperature for 18 hours. Dilute with water and separate the precipitate by filtration. Purify by recrystallization from aqueous methanol.

(b) Preparation of 9α,11β-dichloro-16α-methyl-1,4-pregnadiene-17α,21-diol-3,20-dione 17α-butyrate-21-acetate Add 250 mg. of 9α,11β-dichloro-16α-methyl-1,4-pregnadiene-17α,21-diol-3,20-dione 21-acetate to a freshly prepared solution of 2.5 ml. of butyric acid and 1 ml. of trifluoroacetic anhydride. Heat at approximately 95° C. for 1 hour. Cool the reaction mixture and pour into water. Separate the water insolubles by filtration. Purify the crude residue by chromatography over silica gel, eluting with increasing percentages of ether in hexane. Combine like portions of the eluted di-ester (evaluating by thin layer chromatography, infra red and ultraviolet absorption). Evaporate the combined eluate to dryness and crystallize the di-ester from aqueous methanol.

EXAMPLE 3.—9α,11β-DICHLORO-16α-METHYL-1,4-PREGNADIENE-17α,21-DIOL - 3,20 - DIONE 17α-BUTYRATE-21-PROPIONATE (a) Preparation of 9α,11β-dichloro-16α-methyl-1,4-pregnadiene-17α,21-diol-3,20-dione 17α,21 - methylorthobutyrate To a mixture of 5 g. of 9α,11β-dichloro-16α-methyl-1,4-pregnadiene-17α,21-diol-3,20-dione in 1150 ml. of dry benzene, add 2.85 ml. of trimethylorthobutyrate and 136.5 mg. of para-toluenesulfonic acid monohydrate. Reflux for 30 minutes. Add 5 g. of sodium bicarbonate and 5 ml. of pyridine. Evaporate to a low volume and add hexane to afford a precipitate. Separate the precipitate by filtration and purify by chromatography over silica gel, eluting with chloroform followed by 10 percent ethyl acetate in chloroform. Combine like fractions (comparison by thin layer chromatography, and ultraviolet and infra red spectroscopy). Evaporate the combined eluate to dryness and crystallize from acetone-hexane.

(b) Preparation of 9α,11β-dichloro-16α-methyl-1,4-pregnadiene-17α,21-diol-3,20-dione 17α-butyrate Add 2.32 g. of 9α,11β-dichloro-16α-methyl-1,4-pregnadiene-17α,21-diol-3,20-dione 17α,21-methylorthobutyrate to a solution of 34.8 ml. of acetic acid and 0.69 ml. of water. Allow the reaction mixture to remain at room temperature, with stirring, for 17 hours. Add water and separate the precipitate by filtration. Purify the crude product by recrystallization from acetone-hexane.

(c) Preparation of 9α,11β-dichloro-16α-methyl-1,4-pregnadiene-17α,21-diol-3,20-dione 17α-butyrate-21-propionate To a solution of 1 ml. of pyridine and 0.5 ml. of propionic anhydride, add 0.1 g. of 9α,11β-dichloro-16α-methyl-1,4-pregnadiene-17α,21-diol-3,20-dione 17α-butyrate. Warm at 70° C. for 1 hour. Cool and pour the reaction mixture into water. Separate the precipitate by filtration and purify by recrystallization from aqueous methanol.

EXAMPLE 4.—9α,11β-DICHLORO-16α-METHYL-1,4-PREGNADIENE-17α,21-DIOL - 3,20 - DIONE 17α-PROPIONATE-21-BUTYRATE (a) Preparation of 9α,11β-dichloro-16α-methyl-1,4-pregnadiene-17α,21-diol-3,20-dione 21-butyrate Employing the procedure of Example 2(a), add 1 g. of 9α,11β - dichloro-16α-methyl-1,4-pregnadiene-17α,21-diol-3,20-dione to a solution of 5 ml. of pyridine and 1 ml. of butyric anhydride. After recovery of the crude product, purify by recrystallizing from aqueous methanol.

(b) Preparation of 9α,11β-dichloro-16α-methyl-1,4-pregnadiene - 17α,21 - diol-3,20-dione 17α-propionate-21-butyrate Add 250 mg. of 9α,11β-dichloro-16α-methyl-1,4-pregnadiene-17α,21-diol-3,20-dione 21-butyrate to a freshly prepared solution of 2.5 ml. of propionic acid and 1 ml. of trifluoroacetic anhydride. Heat at about 95° C. for 1 hour. Recover the crude product and purify as described in Example 2(b).

EXAMPLE 5.—9α,11β-DICHLORO-16α-METHYL-1,4-PREGNADIENE-17α,21-DIOL - 3,20 - DIONE 17α-VALERATE-21-ACETATE

Treat 5 g. of 9α,11β-dichloro-16α-methyl-1,4-pregnadiene-17α,21-diol-3,20-dione in 1150 ml. of dry benzene with 2.85 ml. of trimethylorthovalerate and 136.5 mg. of para-toluenesulfonic acid monohydrate according to the process of Example 3(a) to prepare 9α,11β-dichloro-16α-methyl - 1,4 - pregnadiene-17α,21-diol-3,20-dione 17α,21-methylorthovalerate. Hydrolize the methylorthovalerate according to Example 3(b) to prepare 9α,11β-dichloro-16α - methyl-1,4-pregnadiene-17α-21-diol-3,20-dione 17α-valerate. Treat 0.1 mg. of the 17α-valerate with 0.5 mg. of acetic anhydride in 1 ml. of pyridine according to the process of Example 3(c) to prepare 9α,11β-dichloro-16α-methyl-1,4-pregnadiene-17α,21-diol-3,20-dione 17α - valerate-21-acetate.

EXAMPLE 6.—9α,11β-DICHLORO-16α-METHYL-1,4 - PREGNADIENE - 17α,21-DIOL-3,20-DIONE 17α,21 - DIBUTYRATE

To a freshly prepared solution of 50 ml. of butyric acid and 20 ml. of trifluoroacetic anhydride, add 5 g. of 9α,11β - dichloro-16α-methyl-1,4-pregnadiene-17α,21-diol-3,20-dione. Heat at approximately 90° C. on a steam bath for 45 minutes. Allow the reaction mixture to cool and add 20 ml. of water. Pour the resulting mixture into 700 ml. of water and separate the precipitate by filtration. Purify the crude di-ester by chromatography over Florisil (500 g.), eluting with increasing percentages of ether in hexane and combining like fractions. Evaporate the combined eluate to dryness and crystallize the pure di-ester from acetone-hexane.

EXAMPLE 7. — 9α,11β-DICHLORO-16α-METHYL-1,4-PREGNADIENE - 17α,21-DIOL-3,20-DIONE 17α,21-DICYCLOPROPYLCARBOXYLATE

Treat 9α,11β-dichloro-16α-methyl-1,4-pregnadiene-17α,21-diol-3,20-dione (5 g.) with a freshly prepared solution of 50 ml. of cyclopropylcarboxylic acid and 20 ml. of trifluoroacetic anhydride according to the process of Example 1 or 6 to prepare the title compound.

EXAMPLE 8. — 9α,11β-DICHLORO - 16α - METHYL-1,4-PREGNADIENE-17α,21 - DIOL - 3,20 - DIONE 17α,21-DIACETATE

Treat 5 g. of 9α,11β-dichloro-16α-methyl-1,4-pregnadiene-17α,21-diol-3,20-dione in 1150 ml. of dry benzene with 2.85 ml. of triethylorthoacetate and 136.5 mg. of para-toluenesulfonic acid monohydrate according to the process of Example 3(a) to prepare 9α,11β-dichloro-16α-methyl-1,4-pregnadiene-17α,21-diol - 3,20 - dione 17α,21-methylorthoacetate. Hydrolize the 17α,21-methylorthoacetate according to the process of Example 3(b) to prepare 9α,11β-dichloro-16α-methyl - 1,4 - pregnadiene - 17α,21-diol-3,20-dione 17α-acetate. Treat 0.1 mg. of the 17α-acetate with 0.5 ml. of acetic anhydride in 1 ml. of pyridine according to the process of Example 3(c) to prepare 9α,11β-dichloro-16α-methyl - 1,4 - pregnadiene - 17α,21 - diol,3,20-dione 17α,21-diacetate.

The anti-inflammatory di-esters of this invention can be applied topically in the form of ointments, both hydrophilic and hydrophobic, in the form of lotions, which may be aqueous, non-aqeous or of the emulsion type, or in the form of creams. Pharmaceutical carriers useful in the preparation of such formulations will include, for example, one or a mixture of such substances as water, oils, greases, polyesters, fatty acids, waxes, gels, etc. Generally, the anti-inflammatory di-esters of this invention will be present in a minor proportion and the carrier will comprise a major proportion of such pharmaceutical formulations. More particularly, it is contemplated that typical pharmaceutical formulations will be so proportioned as to contain from about .01 to about .25 percent by weight of the anti-inflammatory di-ester. Bacteriostatic agents, pigments, perfumes, anesthetics and the like may also be incorporated in such formulations if desired.

Typical formulations incorporating the anti-inflammatory di-esters of this invention are described below.

ANHYDROUS OINTMENT (HYDROPHILIC)

| Formula: | Grams per kilogram |
|---|---|
| Polyethylene glycol 4000, U.S.P. | 315.0 |
| Polyethylene glycol 400, U.S.P. | 634.9 |
| 9α,11β-dichloro-16α-methyl - 1,4 - pregnadiene 17α,21-diol-3,20-dione 17α,21-diproprionate | 0.1 |
| Perfume, q.s. | |

Melt the polyethylene glycol 4000 together with the polyethylene glycol 400 at 60° C. Cool to 55° C. Add the 9α,11β-dichloro-16α-methyl - 1,4 - pregnadiene - 17α,21-diol-3,20-dione 17α,21-dipropionate with stirring. Add the perfume and cool with continued stirring to 30° C.

AQUEOUS LOTION

| Formula: | Grams per kilogram |
|---|---|
| 9α,11β-dichloro-16α-methyl - 1,4 - pregnadiene 17α,21-diol-3,20-dione 17α - propionate-21-butyrate | 1.0 |
| Acrysol A3 (Rohm and Haas) | 850.0 |
| Purified water | 149.0 |
| Perfume, q.s. | |

Disperse the 9α,11β-dichloro-16α-methyl-1,4-pregnadiene - 17α,21-diol-3,20 - dione 17α - proproionate - 21 - butyrate in the water. Add this dispersion to the Acrysol A3 with stirring at room temperature. Add the perfume and stir until homogeneous.

OIL/WATER LOTION

| Formula: | Grams per kilogram |
|---|---|
| (Premix A)— | |
| Stearic acid, U.S.P. | 50.0 |
| Lanolin anhydrous, U.S.P. | 20.0 |
| Oleic acid, U.S.P. | 15.0 |
| Propylparaben, U.S.P. | 0.2 |
| Mineral oil, U.S.P. | 225.0 |
| (Premix B)— | |
| Methylparaben, U.S.P. | 1.5 |
| Glycerin, U.S.P. | 35.0 |
| Triethanolamine, U.S.P. | 18.0 |
| 9α,11β-dichloro-16α-methyl - 1,4 - pregnadiene 17α,21-diol-3,20-dione 17α,21-dibutyrate | 2.5 |
| Purified water | 632.8 |
| Perfume, q.s. | |

Heat Premix A to 72° C. Heat Premix B to 75° C. Add Premix B to Premix A with stirring. Cool to 45° C. Add perfume and cool to 30° C. with continued stirring.

ANHYDROUS OINTMENT (HYDROPHOBIC)

| Formula: | Grams per kilogram |
|---|---|
| Stearyl alcohol, U.S.P. | 30.0 |
| White wax, U.S.P. | 84.0 |
| White petrolatum, U.S.P. | 885.0 |
| 9α,11β-dichloro-16α-methyl - 1,4 - pregnadiene 17α,21-diol-3,20 - dione 17α - butyrate-21-propionate | 1.0 |
| Perfume, q.s. | |

Melt together the petrolatum, stearyl alcohol and white wax at 65 to 70° C. Cool with stirring to 50° C. Add the 9α,11β-dichloro-16α-methyl-1,4-pregnadiene-17α,21-diol - 3,20-dione 17α-butyrate-21-proprionate and stir until dispersed. Add the perfume and continue stirring while cooling to 30° C.

CREAM

| Formula: | Grams per kilogram |
|---|---|
| (Premix A)— | |
| Arlacel (Atlas Chemical Inc.) | 155.0 |
| Spermaceti, U.S.P. | 38.0 |
| Cetyl alcohol | 12.0 |
| Mineral oil, U.S.P. | 20.0 |
| Glycerine, U.S.P. | 45.0 |
| (Premix B)— | |
| Purified water | 728.7 |
| Methylparaben, U.S.P. | 1.2 |
| 9α,11β-dichloro - 16α-methyl-1,4-pregnadiene 17α,21-diol-3,20-dione 17α,21-dipropionate | 0.1 |
| Perfume, q.s. | |

Heat Premix A to 72° C. Heat Premix B to 75° C. Add Premix B to Premix A with stirring. Cool to 40° C. Add the perfume and continue stirring while cooling to 30° C.

Effective anti-inflammatory response is usually achieved by 2 to 3 daily applications of the topical formulations described above. In severe or aggravated conditions, additional medication may be applied.

In addition to the topical formulations described above, the anti-inflammatory di-esters of this invention may be administered subcutaneously and/or intramuscularly, conveniently in the form of aqueous suspensions suitable for injection. Applicants have found that injection of these di-esters results in an unusually prolonged systemic anti-inflammatory response. This prolongation of activity has been confirmed by conventional survival-rate assays in adrenalectomized rats. Usually, injectable formulations will be so proportioned as to afford from 1 to 3 grams per liter of the anti-inflammatory di-ester. Illustrative of typical injectable formulations is the following:

AQUEOUS SUSPENSION

Formula:  Grams per liter
9α,11β-dichloro - 16α - methyl-1,4-pregnadiene-7α,21-diol-3,20-dione 17α,21-dibutyrate ____ 3.0
Disodium phosphate anhydrous, U.S.P. _____ 7.1
Monosodium phosphate monohydrate, U.S.P. __ 3.4
Benzalkonium chloride, U.S.P. _____ 0.2
Water for injection, U.S.P. q.s. add 1.01.

Dissolve the phosphate buffers and the benzalkonium chloride in approximately 80 percent of the water for injection. Agitate until the solution is homogeneous. Filter the solution through a bacteria retentive filter, collecting the filtrate in a closed sterile vessel. Aseptically slurry the 9α,11β - dichloro-16α-methyl-1,4-pregnadiene-17α,21-diol-3,20-dione 17α,21-dibutyrate (previously sterilized) in a portion of the solution and pass through a colloid mill until all steroid particles are uniformly dispersed. Rinse the colloid mill with the remainder of the solution and adjust the volume of the batch with sufficient sterile water for injection to make 1 liter.

The quantity and frequency of injection of the formulation illustrated above will depend upon the nature of the inflammatory condition under treatment. Usually, an effective anti-inflammatory response can be achieved by the injection of 1 cc. of such formulation, either as a single injection or in divided doses. Additional medication may be required in severe or aggravated conditions.

The subject matter which applicants regard as their invention is particularly pointed out and distinctly claimed as follows:

1. 9α,11β-dichloro - 16α - methyl-1,4-pregnadiene-3,20-dione having attached to the 17α- and 21-positions a lower alkanoyloxy group having from 1 to 5 carbon atoms.

2. 9α,11β - dichloro - 16α - methyl-1,4-pregnadiene-17α,21-diol-3,20-dione 17α,21-dipropionate.

3. 9α,11β - dichloro - 16α - methyl-1,4-pregnadiene-17α,21- diol-3,20-dione 17α,21-dibutyrate.

4. 9α,11β - dichloro - 16α - methyl-1,4-pregnadiene-17α,21-diol-3,20-dione 17α-propionate-21-butyrate.

5. 9α,11β - dichloro - 16α - methyl-1,4-pregnadiene-17α,21-diol-3,20-dione 17α-butyrate-21-propionate.

6. 9α,11β - dichloro - 16α - methyl-1,4-pregnadiene-17α,21-diol-3,20-dione 17α-butyrate-21-acetate.

References Cited

UNITED STATES PATENTS

| 2,894,963 | 7/1959 | Gould et al. | 260—397.45 |
| 3,201,391 | 8/1965 | Bowers | 260—239.55 |
| 3,312,590 | 4/1967 | Elks et al. | 167—58 |

LEWIS GOTTS, Primary Examiner

ETHEL G. LOVE, Assistant Examiner

U.S. Cl. X.R.

260—239.55; 424—243